Figure 1:
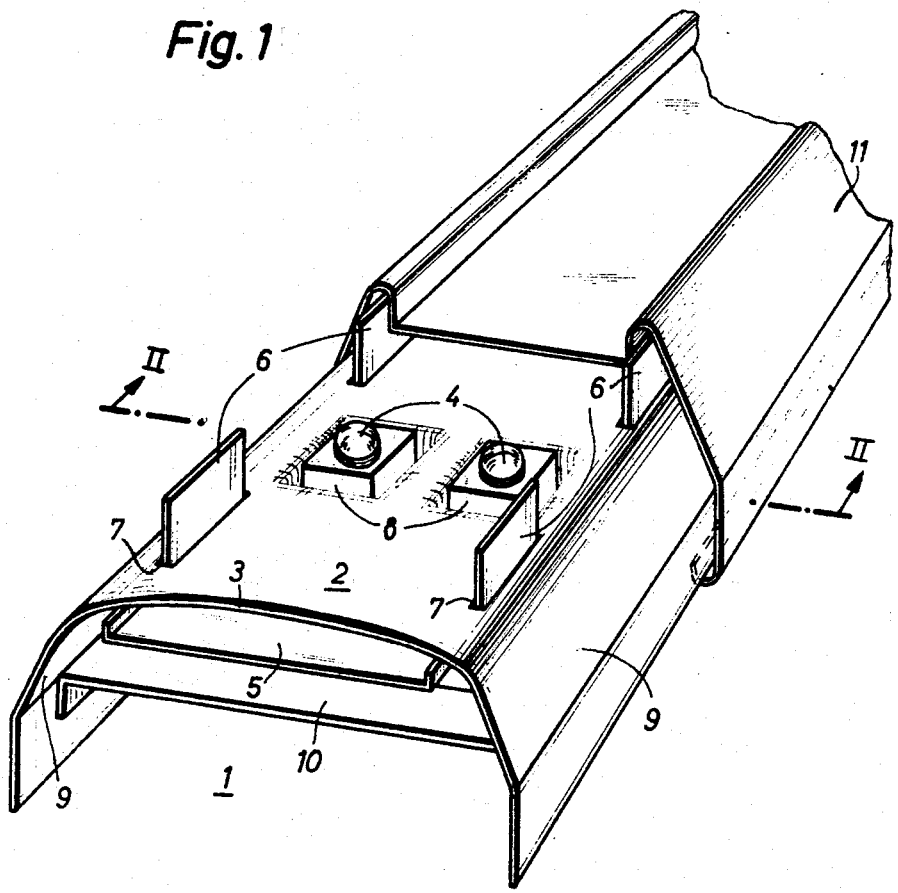

Sept. 27, 1966    H. ENDLER ETAL    3,275,355
COUPLING PIECE FOR UNITING CHANNEL-SHAPED PARTS
Filed Sept. 26, 1963    2 Sheets-Sheet 1

INVENTORS
HERBERT ENDLER &
HEINRICH DUENSING

BY
AGENT

INVENTORS
HERBERT ENDLER &
HEINRICH DUENSING

United States Patent Office 3,275,355
Patented Sept. 27, 1966

3,275,355
COUPLING PIECE FOR UNITING CHANNEL-SHAPED PARTS
Herbert Endler, Hamburg-Gross Borstel, and Heinrich Duensing Hamburg-Rissen, Germany, assignors to North American Philips Company, Inc., New York, N.Y., a corporation of Delaware
Filed Sept. 26, 1963, Ser. No. 311,765
Claims priority, application Germany, Oct. 11, 1962, P 30,341
2 Claims. (Cl. 287—189.36)

This invention relates to improvements in or relating to devices for joining two channel-shaped strips, more particularly two channel-shaped rails for carrying lighting fittings, in end-to-end relationship with the aid of a coupling member inserted in both channels.

Such devices are used to join a number of channel-shaped rails for carrying lighting fittings in end-to-end relationship. Hitherto coupling members used for this purpose were secured to the channel strips with the aid of screws or rivets. This arrangement has a limitation in that the channel and/or coupling devices must be manufactured within very close tolerances and that much time and skill are needed to mount the coupling members in their required position, for example, on a high ceiling.

In order to avoid these disadvantages a device for joining two channel strips has been proposed in which the coupling member comprises a base plate and two angle bars loosely supported thereon, a thrust plate adapted to be drawn by drawing means against the base plate engaging one limb of each of said angle bars and, when drawn towards the base plate, exerting such pressure on the said limbs, that the other limbs of the angle bars supported along their apices and the base plate are forced against the inner surface of each channel strip. Since, however, this coupling member comprises several component parts its manufacture is comparatively expensive and its manipulation still is not as simple as is desired in practice.

The invention obviates these disadvantages and provides an inexpensive device of the kind described immediately above which can be mounted in an extremely simple manner. The improved coupling member comprises a substantially U-shaped elastically deformable support which is substantially conformed to the internal dimensions of the channel strips to be joined. The central portion of this support is arched outwards in the unloaded condition, while below this central part is arranged a plate-shaped thrust member which can be urged against the support by tightening means. Projections, which are passed through apertures in the support, are thrust against the inner surfaces of the channel strips when the thrust member is moved. The arched central portion of the support is then bent flat so that the limbs of the support are pressed outwardly against the inner surfaces of the channel strip.

The tightening means acting upon the thrust member preferably are in the form of screws passing through the thrust member and engaging in screwthread of nuts arranged on the central portion of the support.

The projections of the thrust member preferably consist of lugs bent at right angles from the thrust plate.

Figure 2:
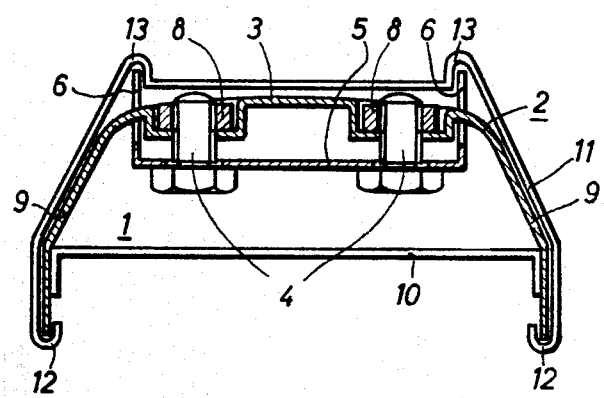
Figure 3:
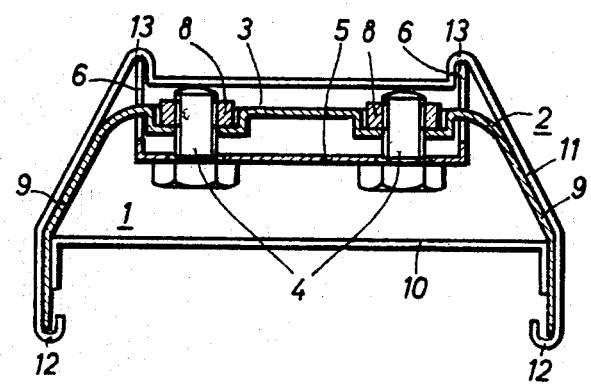

In order that the invention may be carried into effect, an embodiment thereof will now be described, by way of example, with reference to the accompanying drawings, in which:

FIG. 1 is a perspective view of a coupling device in accordance with the invention, showing one half of the device inserted into a channel strip, and
FIGS. 2 and 3 are cross-sectional views, taken on the line II—II of FIG. 1, of the coupling device which in FIG. 2 is loosely inserted and in FIG. 3 has been tightened.

The coupling member 1 in accordance with the invention comprises a substantially U-shaped elastically deformable support 2 the central portion 3 of which is arched outwards when not loaded. Below the central portion 3 is arranged a thrust member 5 adapted to be urged against the support 2 by means of tightening screws 4. Projections in the form of lugs 6 bent at right angles from the plane of the thrust plate 5 extend through apertures 7 in the central portion 3 of the support 2. The tightening screws 4 engage in nuts 8 secured to the central portion 3 of the support. In order to arch the central portion 3 of the support 2, internally metal crosspieces 10 are welded or riveted to the support 2 which preferably is made of sheet iron, in a manner such that the limbs 9 of the support 2 are subjected to a slight initial tension.

About half of the coupling member 1 is inserted into a channel strip 11 so that the edges of the limbs 9 of the support 2 engage in corresponding guiding grooves 12 (FIGS. 2 and 3) of the channel strip 11 and the lugs 6 of the thrust member 5 engage in channel-shaped projections 13 of the channel strip 11. The other half of the coupling member 1 is then inserted into another identical channel strip (not shown) until the two strips engage one another at about the center of the coupling member 1.

The support 2 substantially conforms to the internal dimensions of the channel strips 11. When the coupling member is loosely inserted (FIG. 2), the central portion 3 of the support 2 is slightly arched outwards. By tightening the screws 4 the thrust member 5 is urged towards the central portion 3 so that the lugs 6 of the thrust member 5 are pressed against the inner surface of the channel-shaped projections 13 and the edges of the limbs 9 of the support 2 are pressed against the inner surfaces of the guiding grooves 12 in the channel strips 11. When the screws 4 are further tightened, the support 2 is elastically deformed, that is to say, its central portion 3 is flattened so that the limbs 9 are moved slightly apart and substantially throughout their surfaces firmly engages the corresponding inner surfaces of the channel strips 11 (FIG. 3). This results in engagement over a large area and hence in a reliably fixed but readily detachable coupling between the channel strip 11 and the coupling member 1.

The lugs 6 may alternatively be made longer than illustrated or even extend substantially the entire length of the coupling member 1.

If the channel strips 9 are designed as rails for carrying lighting fittings, the fitting components, including lamps, lampholders, ballasts etc. are fastened to the strips 9 after the latter have been mounted in position.

What is claimed is:
1. A coupling for joining channel-shaped members having a reverse bend portion at each extreme tip thereof, said coupling comprising an elastically deformable support means of substantially the same shape and dimensions of said channel-shaped members adapted to nest loosely within said members, and supported in said reverse bend, a thrust member connected with said support means, said thrust member having a plurality of projections extending beyond said support means for bearings on said channel members and means for moving said thrust member relative to said support means for deforming said support means into intimate frictional engagement with said channel members.

2. A coupling according to claim 1 wherein said channel members are generally inverted U shape having recesses intermediate the base wall and side walls defining said U shape said recesses receiving said projections for urging said support means against said reverse bend portion whereby said support means is deformed upon movement of said thrust member toward said recesses.

References Cited by the Examiner

UNITED STATES PATENTS

| | | | |
|---|---|---|---|
| 249,397 | 11/1881 | Rader | 285—397 |
| 2,904,144 | 9/1959 | Moore. | |
| 3,034,613 | 5/1962 | Heltzel. | |

CARL W. TOMLIN, *Primary Examiner.*

THOMAS F. CALLAGHAN, I. B. TALTON, *Assistant Examiners.*